United States Patent [19]

Vilkomerson

[11] 4,165,182

[45] Aug. 21, 1979

[54] SYSTEM FOR OBTAINING DISPLACEMENT-AMPLITUDE INFORMATION FROM A QUADRATURE-DUAL INTERFEROMETER

[75] Inventor: David H. R. Vilkomerson, 2 Carter Brook La, R.D. 4, Princeton, N.J. 08540

[73] Assignee: The United States of America as represented by the Department of Health, Education and Welfare, Washington, D.C.

[21] Appl. No.: 859,079

[22] Filed: Dec. 9, 1977

[51] Int. Cl.² ............................................. G01B 9/02
[52] U.S. Cl. .................................. 356/349; 356/360; 73/603
[58] Field of Search .................... 356/349, 360; 73/603

[56] References Cited

U.S. PATENT DOCUMENTS

| 3,202,052 | 8/1965 | Rambauske | 356/349 X |
| 3,969,578 | 7/1976 | Mezrich et al. | 73/603 X |
| 4,019,818 | 4/1977 | Vilkomerson | 73/603 X |

Primary Examiner—Conrad J. Clark
Attorney, Agent, or Firm—Browdy and Neimark

[57] ABSTRACT

A method and apparatus for directly obtaining displacement-amplitude information from a quadrature-dual interferometer. The system uses a "mini-wiggler" to introduce phase shift into the reference beam, as by oscillating a reference mirror with a piezo-electric crystal. The mini-wiggler produces relatively small phase perturbations of the order of 0.001λ at a frequency at either edge or in the middle of the signal frequency band. The system uses a signal-processing circuit to obtain displacement amplitude directly. The purpose of the mini-wiggler is to produce a "pilot" signal of known amplitude and phase from which the correction terms needed to compensate for variations in the interferometer state, such as those caused by vibration, large variation, drift, and the like, are derived and can be applied by means of another signal processing circuit.

10 Claims, 3 Drawing Figures

SYSTEM FOR OBTAINING DISPLACEMENT-AMPLITUDE INFORMATION FROM A QUADRATURE-DUAL INTERFEROMETER

FIELD OF THE INVENTION

This invention relates to systems for the measurement of ultrasonic waves, and more particularly to interferometers of the type employing two phase-quadrature reference beams of coherent light which interfere with a signal beam of coherent light reflected from a spot of a displaceable signal mirror insonified by an ultrasonic wave.

BACKGROUND OF THE INVENTION

U.S. Pat. No. 4,019,818 to D. H. R. Vilkomerson discloses a quadrature-dual-interferometer which simultaneously employs two phase-quadrature beams of coherent light which interfere with a signal beam of coherent light from a spot of a displaceable signal mirror insonified by an ultrasonic wave and which permits an output signal to be derived which is proportional to the sum of the squares of the ultrasonic frequency component of the interference between the signal beam and each respective one of the reference beams. This output signal is inherently substantially proportional to the intensity of the ultrasonic wave then insonifying the spot of the signal mirror and independent of random phase drift and environmental vibrations in the interferometer. Thus, in this quadrature-dual-interferometer, by squaring and summing the signals from the two channels, a stable signal, proportional to the square of the displacement of the measuring mirror, is obtained.

The squaring operation destroys the phase information about the signal and imposes circuit difficulties in that the squaring operation doubles the frequency and cuts the dynamic range attainable. If the signal is of a bandwidth greater than an octave, the squaring procedure introduces distortion in the form of new components of the signal appearing due to cross-products between spectral components of the signal. Therefore there is a need for an improved arrangement which avoids these problems.

A preliminary search of the prior art relating to the subject matter of the present invention reveals the following U.S. patents of interest:
Rambauske, et al., U.S. Pat. No. 3,202,052
Mezrich, et al., U.S. Pat. No. 3,969,528
Wang, U.S. Pat. No. 4,005,935
Redman, et al., U.S. Pat. No. 4,005,936
Vilkomerson, U.S. Pat. No. 4,019,818

SUMMARY OF THE INVENTION

A main object of the invention is to provide a novel and improved quadrature-dual-interferometer which overcomes the above-mentioned defeciencies and problems of the prior art interferometer systems.

A further object of the invention is to provide an improved quadrature-dual-interferometer wherein the displacement amplitude of the measuring mirror can be obtained directly and wherein compensation is made for variations in the interferometer state, such as ambient vibrations, drifts, and the like.

A still further object of the invention is to provide an improved quadrature-dual-interferometer system for measuring ultrasonic waves which employs a vibratory reference mirror producing a pilot signal of known amplitude and phase from which correction terms can be obtained, needed to compensate for variations in the interferometer state, such as ambient vibrations, drifts, laser variations, variations in beam overlap, variations in coherence, and the like.

The system of the present invention avoids the above-mentioned deficiencies of the system disclosed in U.S. Pat. No. 4,019,818 by the addition of one optical component, and by employing improved electronic signal-processing circuits for directly obtaining the displacement amplitude.

The additional optical component is a "mini-wiggler", which introduces a phase shift into the reference beam, as by moving the reference mirror back and forth by means of a piezo-electric crystal. Such a "wiggler" is described in U.S. Pat. No. 3,969,578, to Mezrich, et al, but in said patent the wiggler is required to produce phase excursions corresponding at least to more than one-half the wavelength of the laser light being employed. In the system of the present invention the mini-wiggler is operated to produce phase perturbations of just a few nanometers (namely, of the order of one-thousandth of the wavelength) at a frequency at either edge or even in the midst of the signal frequency band. The purpose of the mini-wiggler is to produce a "pilot" signal of known amplitude and phase, from which can be obtained the correction terms needed to compensate for the variations in the interferometer state, i.e., the vibrations, drifts, etc. As the signals obtained from each channel of the quadrature-dual-interferometer are generated by changes in path-length difference, whether these signals arise from motion of the reference mirror or measuring mirror (pellicle) are indistinguishable.

BRIEF DESCRIPTION OF THE DRAWINGS

Further objects and advantages of the invention will become apparent from the following description and claims, and from the accompanying drawings, wherein:

DESCRIPTION OF PREFERRED EMBODIMENTS

Figure 1:
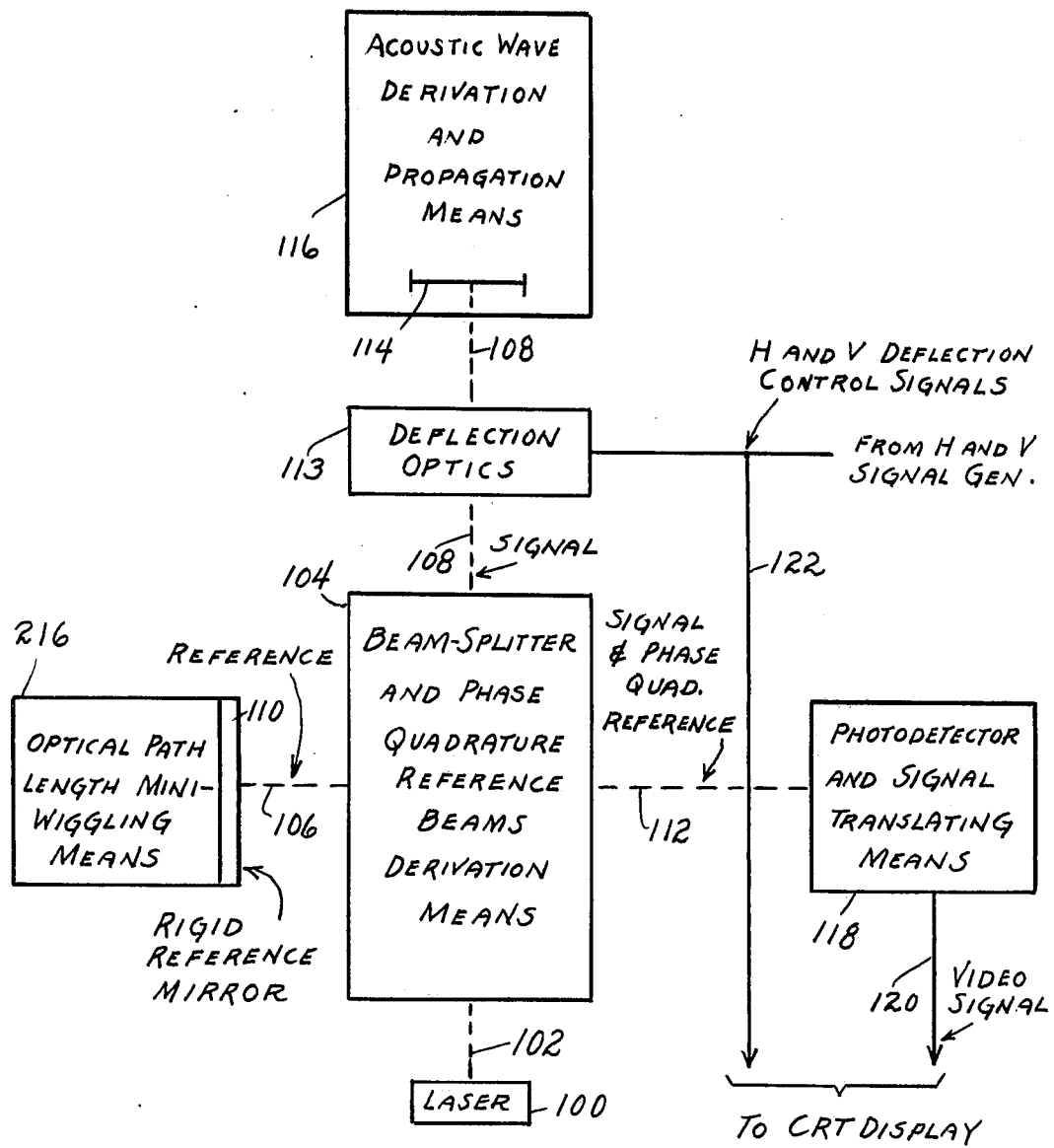
FIG. 1 is a block diagram of an ultrasonic wave measuring system constructed in accordance with the present invention.

Referring to the drawings, FIG. 1 schematically illustrates an ultrasonic wave imaging system generally similar to that disclosed in U.S. Pat. No. 4,019,818 but containing improvements in accordance with the present invention. In this system, as described in said prior U.S. patent, laser 100 generates a beam of monochromatic coherent light 102, which illuminates beam splitter and phase quadrature reference beam derivation means 104, which serves to split the light wave energy beam 102 into two effectively coincident, or side-by-side, reference beams 106 and a signal beam 108. The two reference beams 106, after reflection from a rigid reference mirror 110 and a second passage through beam-splitter and phase quadrature reference beam derivation means 104, form two effectively coincident, or at least side-by-side, phase quadrature reference components of output beam 112. Signal beam 108, under the control of deflection optics 113, raster-scans the surface of signal mirror 114 in both the horizontal and vertical directions. Acoustic wave derivation propagation means 116, which includes a liquid acoustic wave propagation medium in which signal mirror 114 is immersed, insonifies signal mirror 114 with an ultrasonic wave field. Each point of the surface of signal mirror 114 vibrates with a displacement amplitude determined by the intensity of the insonifying ultrasonic wave field at that point.

After reflection from signal mirror 114 and a reverse passage through deflection optics 113 and beam splitter and phase quadrature reference beam derivation means 104, signal beam 108 forms a signal component of output beam 112. Output beam 112 illuminates photodetector and signal translating means 118, which serves to derive a video signal output 120 which has a magnitude at any instant that is substantially proportional to the intensity of ultrasonic radiation insonifying the spot on the surface of the signal mirror being illuminated by signal beam 108 at that instant.

Video signal output 120 along with the same horizontal and vertical deflection control signals 122 which control deflection optics 113 are applied to a CRT display to produce a display of the ultrasonic wave field insonifying signal mirror 114.

The detailed structure of deflection optics 113 may be substantially identical with that shown in the abovementioned U.S. Pat. No. 3,969,578 to Mezrich, et al, FIG. 2, and the detailed structure of acoustic wave derivation propagation means 116 may be substantially identical with that shown in FIGS. 3a, 3b or 3c of said U.S. Pat. No. 3,969,578. The beam-splitter and phase quadrature reference beam derivation means may be similar to either of the embodiments thereof described in U.S. Pat. No. 4,019,818.

As described in U.S. Pat. No. 4,019,818, a portion of reference beam 106 (identified as 106a in said patent) together with a portion of reflected signal beam 108 form interfering signal components 112a (see FIG. 2) of the output beam 112. Another portion (identified as 106b in said patent) together with another portion of reflected signal beam 108 form interfering components 112b (see FIG. 2) of the output beam 112. Output beams 112a and 112b comprise side-by-side portions of the resultant output beam 112 shown in FIG. 1.

U.S. Pat. No. 4,019,818 employs a stationary rigid reference mirror 110 and a photodetector and signal translating means for providing a signal proportional to the sum of the squares of the respective intensities of the therein-derived beams 112a and 112b (i.e., proportional to the squares of the displacements of the measuring mirror 114). As above-mentioned, the squaring operation destroys the phase information about the signal and imposes circuit difficulties in that the squaring operation doubles the frequency and cuts the dynamic range attainable. Also, if the signal is of bandwidth greater than an octave, the squaring procedure introduces distortion in the form of new components of the signal appearing due to cross-products between spectral components of the signal.

To avoid the above problems, in the present invention the rigid reference mirror 110 is driven back and forth by a "mini-wiggler" 216, as by means of a piezoelectric crystal, similar to that described in U.S. Pat. No. 3,969,578 to Mezrich, et al., which introduces a phase shift into the reference beam. Whereas in U.S. Pat. No. 3,969,578 the wiggler is driven at a relatively large amplitude, to produce phase excursions of equal to or greater than one-half wavelength and operates at a frequency much below the signal frequency, the mini-wiggler 216 of the present invention is driven at a relatively small amplitude, to produce phase perturbations of just a few manometers (i.e., about $0.001\lambda$) at a frequency at either edge or even in the middle of the signal frequency band. Also, as will presently be described, the mini-wiggler 216 acts to produce a "pilot" signal of known amplitude and phase from which can be obtained the correction terms needed to compensate for the operating variations in the interferometer state, such as ambient vibrations, drifts, and the like.

Figure 2:
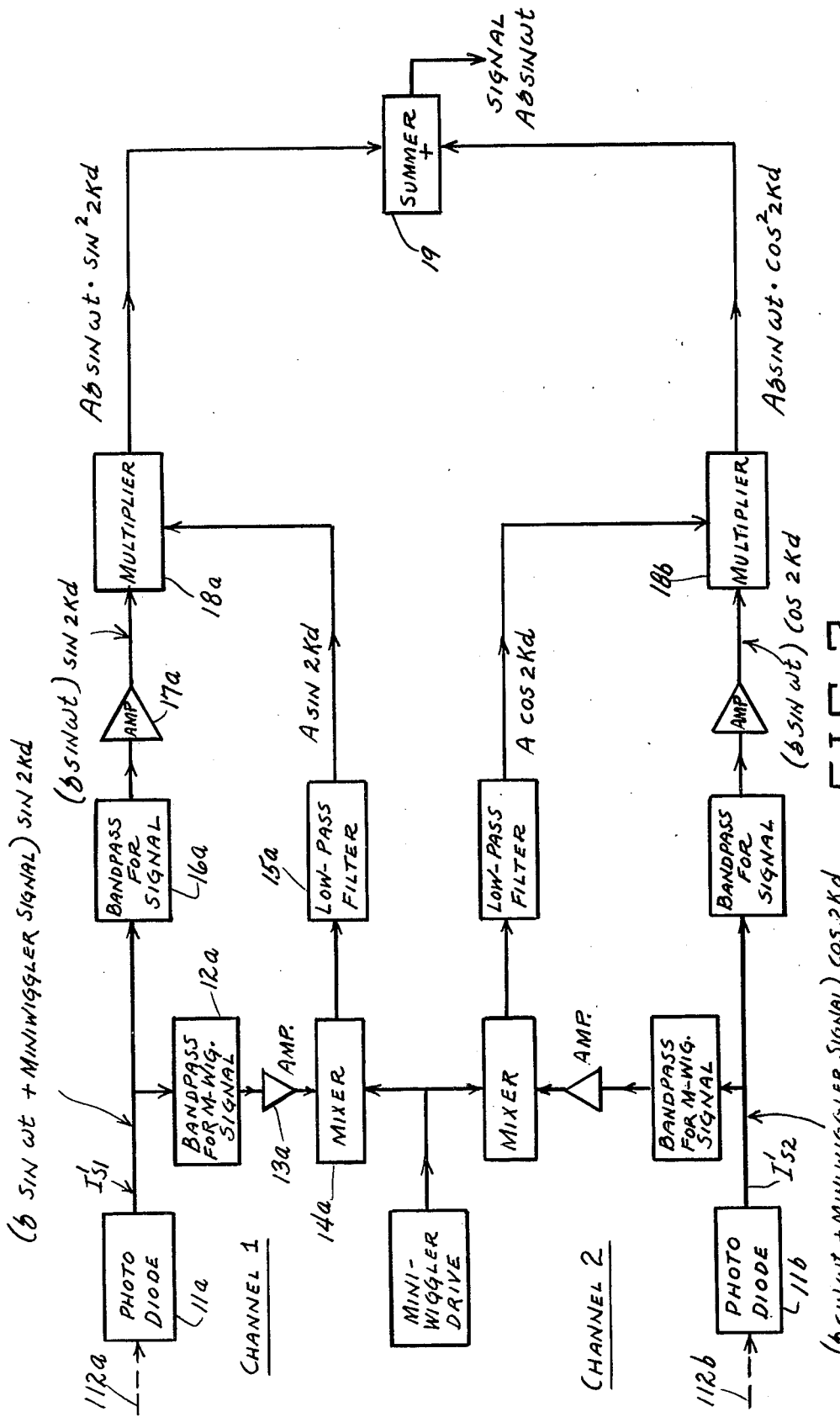
FIG. 2 is a schematic block diagram showing an embodiment of a signal processing circuit employed in an ultrasonic wave measuring system according to the present invention.

FIG. 2 schematically represents one form of signal-processing circuit which can be employed in accordance with the present invention. Photo diodes 11a and 11b respectively receive the output beam components 112a and 112b and provide electrical outputs $I'_{S1}$ and $I'_{S2}$ comprising the respective total electrical signals presented to Channels 1 and 2 of the circuit.

$I'_{S1}$ represents the signal mirror 114 displacement signal ($\delta$ signal) plus the mini-wiggler signal, multiplied by sin 2kd, where k is a constant and d is the relative path length difference around which the signal mirror displacement of interest is taking place. As shown, in Channel 1 the mini-wiggler signal is extracted from the total signal by means of a band pass filter 12a and is amplified in an amplifier 13a and mixed with the mini-wiggler drive signal in a mixer 14a. The relative path length difference d around which the displacement of interest is taking place is obtained from mixer 14a via a low pass filter 15a, in the form of A sin 2kd, where A is a maximum sensitivity term. This same factor, A sin 2kd, is the relative sensitivity of Channel 1; the displacement amplitude is essentially modulated by this term.

After extraction of the mini-wiggler signal, filtering through a band pass filter 16a and amplification by an amplifier 17a, the output of amplifier 17a becomes $\delta$ sin $\omega t \cdot$sin 2kd, where $\delta$ represents the peak amplitude displacement of signal mirror 114. By multiplying this signal by A sin 2kd in a multiplier 18a, the product term $A\delta$ sin $\omega t(\sin^2 2kd)$ is obtained.

In the quadrature channel (Channel 2) the same procedure is followed, with cos 2kd replacing sin 2kd, giving as the output of a multiplier 18b the term $A\delta$ sin $\omega t(\cos^2 2kd)$. The respective outputs of multiplier 18a and multiplier 18b are summed in a summer 19, providing as a sum the term $A\delta$ sin $\omega t$, which is the direct-amplitude displacement signal desired.

Figure 3:
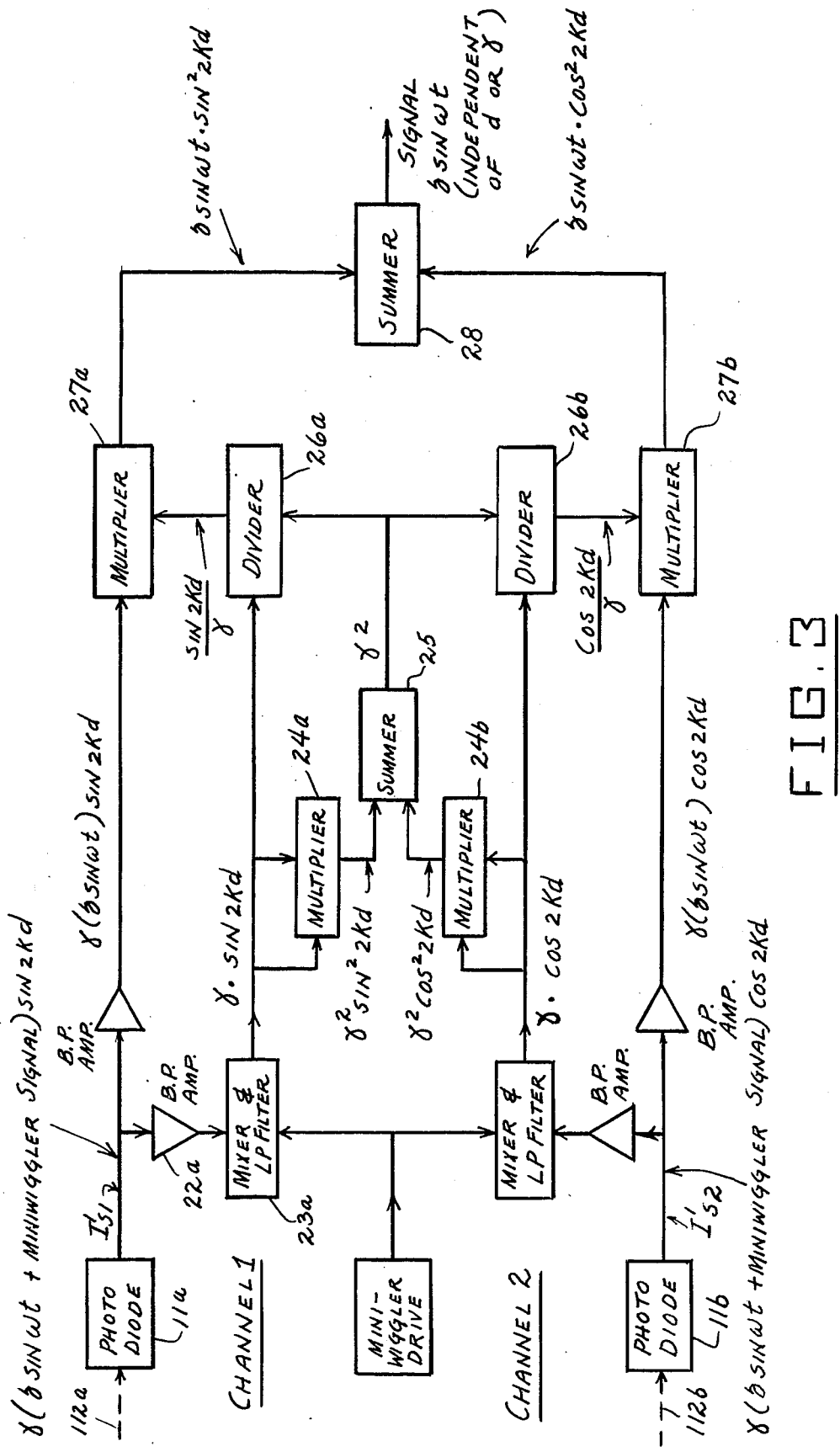
FIG. 3 is a schematic block diagram showing another embodiment of a signal processing circuit employed in an ultrasonic wave measuring system according to the present invention, wherein the mini-wiggler signal is employed as a standard to correct for laser variations and variations in beam overlap, coherence, etc.

The mini-wiggler signal is of known amplitude and can be used as a standard to correct for laser variations and variations in beam overlap, coherence, etc., by means of a modified circuit arrangement such as that shown in FIG. 3. The correction coefficient for variations in beam characteristics and variations in beam overlap, coherence, etc., which equally influence both channels, is designated by $\gamma$. This coefficient $\gamma$ is extracted by squaring and summing the terms $\gamma$ sin 2kd and $\gamma$ cos 2kd obtained in the same manner as in the embodiment of FIG. 2. (The amplitude of the mini-wiggler signal is normalized to be 1). Thus, for Channel 1 the mini-wiggler signal is extracted from the total signal $I'_{S1}$ by a band pass-amplifier stage 22a and mixed with the mini-wiggler drive signal in a mixer-low pass filter stage 23a to derive the $\gamma \sin 2kd$ output, which is squared in a multiplier 24a to produce $\gamma^2 \sin^2 2kd$. Similarly, Channel 2 has a corresponding configuration producing $\gamma^2 \cos^2 2kd$ at the output of a multiplier 24b. The squared outputs are summed in a summer 25, producing $\gamma^2$ at its output. The term $\gamma^2$ is used respectively as the divisor for $\gamma \sin 2kd$ and $\gamma \cos 2kd$ in dividers 26a and 26b to yield respective multiplying factors $\sin 2kd/\gamma$ and $\cos 2kd/\gamma$ for Channels 1 and 2 at the outputs of dividers 26a and 26b. These factors are respectively multiplied with $\gamma(\delta \sin \omega t) \sin 2kd$ and $\gamma(\delta \cos \omega t) \cos 2kd$ in multipliers 27a and 27b to yield the terms $\delta \sin \omega t \cdot \sin^2 2kd$ and $\delta \sin \omega t \cdot \cos^2 2kd$, which are added in a summer 28. Thus, the $\gamma$ term in the quadrature signals is cancelled and the output of summer 28 yields an amplitude signal $\delta \sin \omega t$ independent (within the limits of the circuitry of FIG. 3) of the beam characteristics as well as of the state of the interferometer.

In the above-discussion the $\omega$ term represents $2\pi f$, where f is the frequency of the ultrasonic signal causing displacement of the signal mirror 114. The frequency of vibration of the mini-wiggler 216 may be at either edge or in the middle of the signal frequency band, namely, near the signal frequency.

While certain specific embodiments of an improved system for the measurement of ultrasonic waves have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. In a system responsive to the intensity of radiated ultrasonic wave energy in a given frequency band, the combination comprising first means including photodetector and signal translating means, responsive to the simultaneous illumination thereof with respective first and second beams of coherent light of a predetermined wavelength each of which has an intensity component at a given frequency in said band, second means comprising an interferometer for simultaneously illuminating said photodetector and signal translating means with said first and second beams, said interferometer including a vibrating reference mirror, a displaceable signal mirror adapted to be insonified by said ultrasonic wave energy, and beam splitter and phase quadrature reference beam derivation means illuminated by said coherent light, said beam splitter and phase quadrature beam derivation means being cooperatively located with respect to said reference mirror and said signal mirror to derive as said first beam the interference between signal light reflected from an insonified spot of said signal mirror and first reference light reflected from said reference mirror that has a first temporal reference phase and to derive as said second beam the interference between said signal light and second reference light reflected from said reference mirror that has a second temporal reference phase substantially in quadrature with said first temporal reference phase, and means to directly derive an output signal having a magnitude in accordance with the displacement of said signal mirror comprising means to generate first and second intensity signals from said first and second beams, said intensity signals including respective quadrature modulation components derived from said vibrating reference mirror, means to derive from said intensity signals product terms representing respectively the signal mirror displacement multiplied by squared vibrating mirror quadrature components, and means to combine said last-derived terms so that the sum of the squared vibrating mirror quadrature components defines a constant-value coefficient for the signa mirror displacement magnitude.

2. The combination defined in claim 1, and wherein said vibrating mirror is driven at a constant frequency and amplitude.

3. The combination defined in claim 2, and wherein said vibrating mirror has an amplitude which is small relative to the wavelength of the beams of coherent light.

4. The combination defined in claim 2, and wherein said vibrating mirror has an amplitude of the order of one-thousandth of the wavelength of the beams of coherent light.

5. The combination defined in claim 2, and wherein the frequency of said vibrating mirror is near the frequency of the radiated ultrasonic wave energy.

6. The combination defined in claim 2, and wherein the frequency of said vibrating mirror is substantially within the frequency band of said radiated ultrasonic wave energy.

7. The combination defined in claim 1, and wherein the means to derive said product terms from said intensity signals comprises means to extract vibrating mirror quadrature component portions from said intensity signals, leaving residues comprising respective signals representing the signal mirror displacement modulated by the vibrating mirror displacement quadrature components, means to separate relatively high-frequency vibrating mirror drive components from said vibrating mirror quadrature component portions, and means to multiply the relatively low-frequency residues of the vibrating mirror quadrature component portions with said first-named signal residues.

8. The combination defined in claim 7, and wherein said first and second intensity signals include common $\gamma$ coefficients representing correction terms to compensate for variations in the interferometer state, and circuit means connected between said extraction means and said multiplying means to derive cancellation factors to cancel the $\gamma$ coefficients from said first-named signal residues by the subsequent multiplications.

9. The combination defined in claim 8, and wherein said circuit means includes squaring means for the $\gamma$ coefficients along with the vibrating mirror quadrature components.

10. The combination defined in claim 9, and wherein said circuit means includes means to divide the squared $\gamma$ coefficients into the respective first-named signal residues.

* * * * *